2-212 S4
/14/87 03 RE 32,395

United States Patent [19]
Geffroy et al.

[11] E Patent Number: Re. 32,395
[45] Reissued Date of Patent: Apr. 14, 1987

[54] PISTON AND PISTON RINGS SET

[76] Inventors: Robert Geffroy; Christophe Geffroy, both of 1 Blvd. Richard Wallace, Neuilly s/s Maillot 38-57, Paris, France

[21] Appl. No.: 766,247

[22] Filed: Aug. 16, 1985

Related U.S. Patent Documents

Reissue of:
[64] Patent No.: 4,516,481
Issued: May 14, 1985
Appl. No.: 344,732
Filed: Feb. 1, 1982

[30] Foreign Application Priority Data

Feb. 6, 1981 [FR] France ..... 81 02353
Dec. 23, 1981 [FR] France ..... 81 24100
Jan. 15, 1982 [FR] France ..... 82 00625

[51] Int. Cl.[4] ..... F16J 1/04; F16J 9/20; F16J 15/32

[52] U.S. Cl. ..... 92/212; 92/158; 92/240; 92/246; 123/193 P; 277/139; 277/148; 277/216

[58] Field of Search ..... 92/193, 194, 160, 212, 92/240, 246, 241, 245, 158, 159; 123/193 P; 277/216, 139, 148, 220, 24, 212 C, 152

[56] References Cited

U.S. PATENT DOCUMENTS

| | | | |
|---|---|---|---|
| 2,319,097 | 5/1943 | Zahodiakin | 277/148 |
| 2,343,530 | 3/1944 | Bruegger | 92/158 |
| 2,591,920 | 4/1952 | Colvin | 277/216 |
| 2,844,427 | 7/1958 | Muller et al. | 92/246 |
| 2,886,479 | 5/1959 | Riedel | 277/220 |
| 2,903,308 | 9/1959 | Barnhart | 92/246 |
| 3,522,950 | 8/1970 | Schneck, Jr. | 92/212 |
| 3,720,418 | 3/1973 | Berg | 277/24 |
| 3,759,148 | 9/1973 | Geffroy | 92/193 |
| 4,093,241 | 6/1978 | Montjanoff et al. | 277/24 |
| 4,185,842 | 1/1980 | Magara | 277/216 |
| 4,462,602 | 7/1984 | Braüers et al. | 277/139 |

FOREIGN PATENT DOCUMENTS

| | | | |
|---|---|---|---|
| 0826487 | 3/1938 | France . | |
| 0869831 | 2/1942 | France . | |
| 008957 | of 1915 | United Kingdom | 92/241 |
| 0123351 | 7/1919 | United Kingdom | 277/216 |
| 1126457 | 9/1968 | United Kingdom . | |
| 635333 | 11/1978 | U.S.S.R. | 277/216 |

*Primary Examiner*—Edward K. Look
*Attorney, Agent, or Firm*—Lloyd M. Forster

[57] ABSTRACT

New assembly of cylinder, lightweight piston and piston rings for engines and compressors comprising in a cylinder a reduced weight piston provided with a new simpler piston rings set of a high efficiency producing a very small tension against the cylinder and lighter than the piston rings set known heretofore and wherein each of the purposes ascribed to the individual piston rings of the set is entirely attained by each piston ring of this assembly.

42 Claims, 26 Drawing Figures

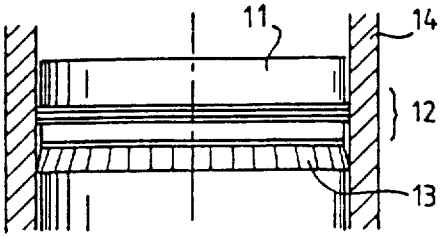
FIG.1
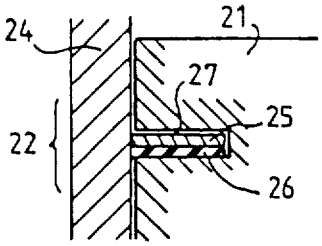
FIG.2
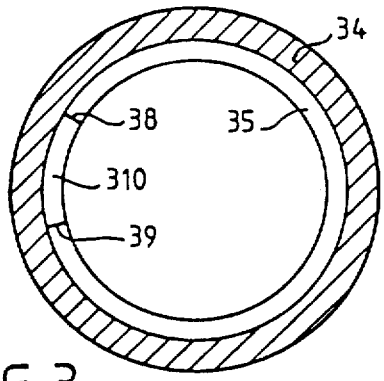
FIG.3
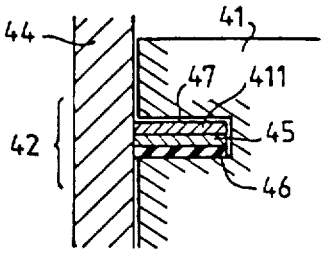
FIG.4
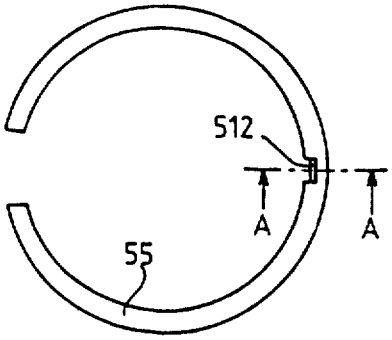
FIG.5
FIG.6
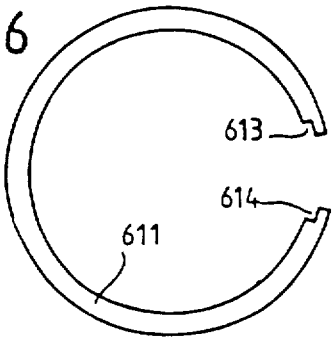
FIG.7
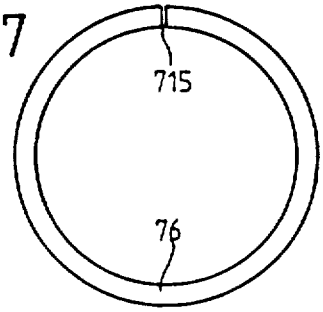
FIG.8
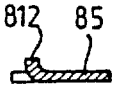

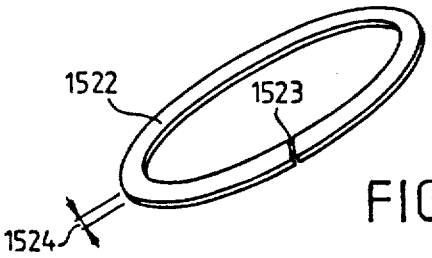
FIG.15
FIG.17
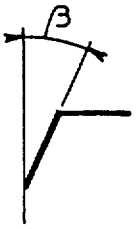
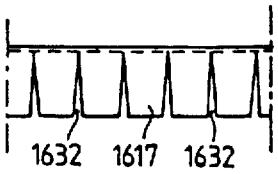
FIG.16
FIG.19
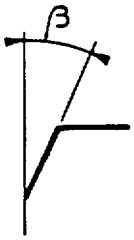
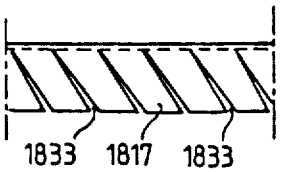
FIG.18
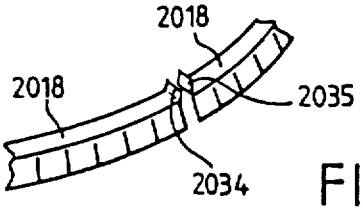
FIG.20

PISTON AND PISTON RINGS SET

Matter enclosed in heavy brackets [ ] appears in the original patent but forms no part of this reissue specification; matter printed in italics indicates the additions made by reissue.

BACKGROUND OF THE INVENTION

The pistons in internal combustion engines or compressors are generally provided with a set of piston rings the purposes of which are preventing, between pistons and cylinders, any leak of gas to the crankcase and of oil to the piston head.

The presently known piston rings of said set interfere in operation one with another and the assembly thereof does not insure completely the attainment of said purposes, each of said piston rings being incapable of playing its entire role.

The compression rings permit passage of the gas (blow-by) from the combustion or compression chamber to the crankcase, and the oil rings scrape in both directions, and thereby work against their purpose in the upward stroke of the piston.

Thus, their roles are not exactly fulfilled thereby resulting in difficult tuning, instabilities, insufficiences and uncertainties of operation.

Finally, all said piston rings are applied with substantial force against the cylinder and are heavy, which results in significant energy consumption by friction and inertia.

The closest known prior art of the present invention includes the following:

U.S. Pat. No. 2,893,797 shows a scraper ring comprising a skirt opened to the crankcase, consisting of tongues applied to the cylinder through the action of a compression ring mounted in the same groove acting by tipping over upon an angled extension of such tongues penetrating said grooves; but the tongues of this ring have no freedom of movement on the piston and application thereof against the cylinder which is rigid is not appropriate for an oil scraping operation which, to be efficient, must be flexible and of low friction.

U.S. Pat. No. 2,846,280 shows flat rings associated with plastic rings configured as either compression rings or scraper rings, but which do not comprise any means for providing them freedom of movement with the piston, or contributing to efficiency or reduction of friction.

French Pat. No. 826,487 shows compression rings composed of thin frusto-conical ring packs comprising retaining means to prevent their cuttings from overlapping each other and applied against the cylinder through deformation of their cones caused by wedging them into their groove; however, such arrangements do not ensure any increased tightness or reduced friction.

U.S. Pat. No. 2,262,311 which shows a flat compression ring formed with many slots therein regularly distributed on the full periphery of the ring; above all it claims characteristics of conformability permitting adaptation thereof to worn cylinders but does not afford any progress in tightness or reduced friction.

French Pat. No. 869,831 shows a compression ring composed of two flat uncut rings mounted to a piston with a dismountable head, equipped with an application spring with a great number of slots in contact with the cylinder obturated by blocking through two superposed rings; here too, with such rings the cutting clearances are obturated but no freedom of movement of the ring in its groove is ensured and the ring does not realize any particular performance in the domain of tightness and reduction of friction.

British Pat. No. 1,126,457 shows a spiral spring for assisting the application force of a conventional ring against the cylinder; such system is known to increase the tension in a conventional ring but does not supply any novel element in the technology of piston rings either relative to tightness or friction against the cylinder.

Related prior art also includes:

U.S. Pat. No. 3,759,148 issued Sept. 18, 1973
U.S. Pat. No. 3,831,952 issued Aug. 27, 1974
U.S. Pat. No. 3,656,766 issued Apr. 18, 1972
U.S. Pat. No. 3,840,182 issued Oct. 8, 1974
U.S. Pat. No. 2,893,675 issued July 8, 1975
U.S. Pat. No. 3,917,290 issued Nov. 4, 1975
U.S. Pat. No. 4,103,594 issued Aug. 1, 1978
French Pat. Appln. No. 81,13347 filed July 8, 1981
French Pat. No. 2,185,094
French Pat. No. 1,540,312
Gr. Britain Pat. No. 593,392

SUMMARY OF THE INVENTION

The present invention relates to an assembly comprising in a cylinder, a reduced weight piston provided with a new simpler piston rings set of a high efficiency producing very low tension and friction against the cylinder, which is lighter than the piston rings set known heretofore, wherein the compression ring elements substantially eliminate blow-by and an oil ring scrapes in a downward direction only to effectively recycle lubricating oil during the upward stroke.

This invention relates to an assembly of cylinder, piston and piston rings for internal combustion motors or compressors, comprising a compression ring consisting of at least one flat thin ring of metal and a one-piece scraper ring of metal consisting of a circular portion connected through a circular fold to a lateral circular row of blades formed into a skirt open to the crankcase characterized in that:

The piston ring set in each piston of engine or compressor comprises:

a compression ring consisting of at least one ring of elastic metal the circular lip of which is applied against the cylinder by elastic tension and which provides at least one mean for reducing if not closing off the passage of gas between the combustion chamber and the crankcase, on the one hand, and on the other hand, for reducing the friction between the said ring and the cylinder.

The compression ring consists of elastic metal, mounted in its groove with a small lateral and axial clearance and it comprises in itself elastic means for applying its outer lip uniformly against the cylinder with a low force which is made possible by its regular spreading, such force being obtained from the only effect of its own elastic tension the cutting in said ring comprising in the section of said thin ring means for at least reducing if not obturating passage of gas through the cutting clearance.

a one piece oil ring of spring steel consisting of a circular row of connective and elastic, very thin, lateral blades connected with one another and with the piston sealingly by the edge of their row located on the side of the piston head and applied against the cylinder by the edge of their row located on the side of the crankcase, by means of the elastic force of each blade, their outer lateral faces being configured to the shape of the cylinder and having with the wall thereof a very acute conical angle opening to the piston head, said blades constituting together an elastic circular skirt closed and sealed on the side of the piston head and opening to the crankcase;

the scraper ring consists of an elastic metal and is very thin; said circular portion is held by the piston in an invariable angular position with respect to its axis, said circular fold providing to the lateral blades a circular edge which is the resting and articulation point thereof to ensure flexible application of their lips against the cylinder by their own very low elastic force, since they are very thin, said blades forming with the cylinder wall an acute angle open to the piston head, having between themselves a very small clearance which makes each of them independent of the adjacent ones, and form together said closed skirt sealed to the top of the piston, open to the crankcase and held in contact with the cylinder, said contact being permanent, elastic, very light and very narrow; and adaptive means for accommodating the piston rings and improvements in the piston and the cylinder.

Such an assembly makes a very simple piston rings set and it is less cumbersome and less heavy than the piston rings set known heretofore. The compression ring ensures highly efficient control of the passage of gases between the combustion or compression chamber and the crankcase, and the oil ring produces two new actions of very high efficiency, the one being a simple effect scraping during the downward stroke of the piston and the other a simple effective recycling during the upward stroke of the piston.

As a matter of fact, in the downward strokes the lower edge of its outer thin and elastic face nearly parallel to the cylinder constitutes an ideal means for scraping off oil, even though its application force on the cylinder is minimum and in the upward strokes the small angle with the cylinder of the wall of its outer face constitutes another ideal planing device wherein its application force on the cylinder is still minimum to recycle, toward the crankcase by dynamic effect, oil subsisting on the cylinder wall.

Moreover, the high and independent efficiency of each of these piston rings creates more favorable conditions for the operation of the other than the previously known mutual interraction. Thus, the purposes attributed to the piston rings set are reached with a high efficiency than by the usual piston rings set, with lesser wear and greater saving of energy. Finally, this better efficiency of each of the piston rings and the smaller friction thereof results in an entirely new lubrication method between piston, piston rings and cylinder, which produces several new operational conditions:

the possibility of adopting for the cylinder walls a polishing level much higher than the usual level thereby to produce further reduction of friction and wear in all the members of said new assemblies which are a supplementary contribution to the savings of energy.

The possibility of establishing the mechanical bearing between the cylinder and the piston up to the piston head, thereby to improve thermal exchanges between cylinder and piston and also due to the fact that it comprises only two piston rings, to permit shortening and thus significant lightening of the piston.

Other characteristics and advantages of this invention will appear from the following description of an assembly according to the invention in the light of the attached drawings.

BRIEF DESCRIPTION OF THE DRAWINGS

FIG. 1 represents, in a cut off cylinder, a piston provided with a piston ring consisting of a compression ring and an oil ring;

FIG. 2 and FIG. 4 are cross-sectional views in enlarged scale of a portion of the piston, showing alternate embodiments of a compression ring, in a cylinder;

FIG. 3 shows means to close off passage of gas through the separated ends of a compression ring;

FIGS. 5, 6 and 7 are planar views of three rings constituting the composite compression ring of FIG. 4;

FIG. 8 is a cross-sectional view in enlarged scale taken along line A—A of FIGS. 5 and 9;

FIG. 15 is a perspective view of an annular spacer for an oil ring;

FIGS. 16 and 18 are two lateral views of an oil ring of FIG. 11 and modification thereof in the free position;

FIGS. 17 and 19 are cross-sectional views of FIGS. 16 and 18;

FIG. 20 is a perspective view of gap ledges added to an oil ring of FIGS. 11, 13 and 16;

DETAILED DESCRIPTION OF PREFERRED EMBODIMENTS

Figure 9:
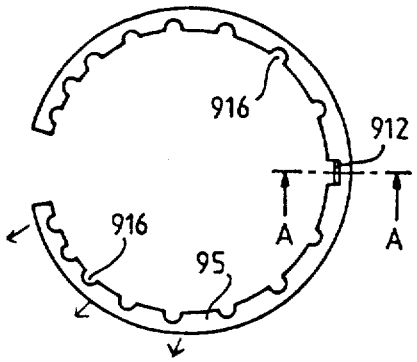
FIGS. 9 and 10 are planar views of a variation of the rings of FIGS. 5 and 6.

FIG. 1 shows a composite compression ring 12 and an oil ring 13 on a piston 11. Such assembly is disposed in a cylinder 14. After describing those piston rings and explaining the working of said assembly, the specificites of the piston and the cylinder which are rendered possible by using said piston rings, will be explained further.

FIG. 2 shows in a partial cross-section of the piston 21 in its cylinder 24 a first form of embodiment of a compression ring 12, 22. It is composed of two thin elements 25 and 26 disposed with clearance 27 in the groove of piston 21. Such clearance 27 is limited to the minimum necessary for ensuring freedom of movement of both thin elements as well as access of the pressure from the combustion or compression chamber through the clearance 27 on the top and on the inner cylindrical face of piston ring 22.

The thin elements of piston ring 22 are a thin cut ring 25 (thickness of about 0.7 mm) of elastic metal, e.g. cast iron or steel, on the one hand, and on the other hand, a thin cut ring 26 (thickness of about 0.5 mm) of a relatively plastic material, such as annealed copper or polytetrafluoroethylene (Teflon). The plastic ring 26 is always disposed between the ring of elastic metal 25 and that groove face of the piston which is on the crankcase side.

The ring 25 in the free position has a diameter larger than that of the cylinder to make it capable of having an expansion force against the cylinder and the closing off of the gas passage by the substantial end clearance along the wall of the cylinder is ensured by the arrangement shown on FIG. 3; ring 25 is represented thereon in a plan view at 35 in its tightened position in its cylinder 34. The length of the end clearance is increased to accommodate between its cutting faces 38 and 39 a ring section 310 having a cross-section similar to that of the metallic rings 35 but of a plastic material, preferably, polytetrafluoroethylene (Teflon).

The sector 310 is placed in the cold state without clearance between the cutting faces 38 and 39 in such a way that, due to the effect from the extension force of the hot dilation of ring 35 and of sector 310, and from the gas pressure on the inner face of the ring and the sector, both of these members are applied against the cylinder, thereby to ensure cooperatively the closing off of the gas passage between the cutting seal of the metallic ring 35 and the cylinder.

The length of sector 310 must be sufficient for its elasticity which is in the order of 4% of its length, for Teflon, to be higher or equal to the sum of the dilation of the ring 35 and the sector 310 to prevent said sector from undergoing permanent reduction of its length.

FIG. 4 shows a modified embodiment 42 of the compression ring 12, in a partial cross-section of the piston 1 in its cylinder 44; the compression ring 42 is composed of three thin elements 45, 46, 411 disposed with clearance 47 in the groove of piston 41. This clearance 47 is limited to the minimum necessary for ensuring the freedom of movement of the three thin elements as well as access of the pressure from the combustion or compression chamber through the clearance 47 on the top and on the inner cylindrical face of compression ring 42.

FIGS. 5 through 7 separately show a planar view of each of these three elements of compression ring 42 which are two thin cut and joined rings 45, 55 and 411, 611 (thickness of about 0.7 mm) made of elastic metal, for example, cast iron or steel, on the one hand and on the other hand, one thin cut ring 46, 76 (thickness of about 0.5 mm) of a relatively plastic material such as annealed copper or polytetrafluoroethylene (Teflon); the plastic ring 46, 76 is always disposed between the central elastic ring 45, 55 and the groove face of the piston which is on the side of the crankcase.

The rings 45, 55 and 411, 611 have in the free position a diameter larger than that of the cylinder to exert an expansion force against the cylinder and their end clearance, as distinguished from the embodiment of FIGS. 1 and 2, is just that required to accommodate hot dilation thereof when mounted on their piston in the cylinder. The plastic ring 46, 76 in free state has approximately the dimension of the cylinder and its clearance of cutting 715 is substantially nil in the cold state so that under the combined effect from thermal dilation and pressure acting through the clearance 47 of the compression ring on its inner cylindrical surface, the ring 46, 76 as well as rings 45, 55 and 411, 611, are applied against the cylinder, the more so because the pressures in the combustion or compression chamber are higher.

In this form of embodiment, in order to be able to close off the passage of gas along the cylinder through the cutting clearance, one has to prevent the rings 45, 55 and 411, 611 from rotating one relative to the other to avoid superposition of their cuttings, but without clamping so that each one is free to move in its plane and apply itself against the cylinder without any stress received from the other or from the piston.

Figure 10:
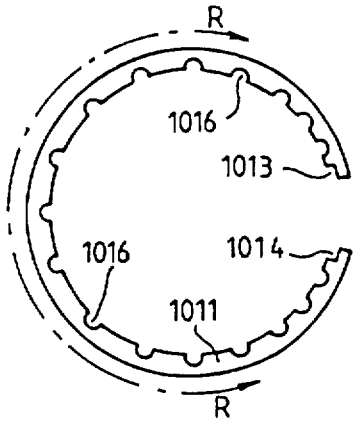

FIG. 8 is a cross-section along line A—A of ring 55 which shows an appropriate relative retention means, i.e. providing on the lower ring 45, 55, 85, 95 (FIG. 9) a lug 512, 812, 912 (FIG. 9) slightly lower than the thickness of the upper ring 411, 611, 1011 (FIG. 10). In said upper ring there is formed a lodging to receive the lug 512, 812, 912 with sufficient clearance for not clamping both rings 45 and 411, 55 and 611, 95 and 1011 (FIG. 10). An appropriate example of such lodging consists of two notches 613, and 614, 1013 and 1014 (FIG. 10); this position of the notches is advantageous because it permits by mounting first the ring 45, 55, 95 in the piston groove to mount thereafter the ring 411, 611, 1011 by aligning its cutting opposite the lug 512, 912.

FIGS. 9 and 10 are planar views of an alternative embodiment of rings 45 and 411. On rings 95 and 1011 as described above there are also formed the lug 912 and notches 1013 and 1014, but supplemental notches 916 and 1016 distributed on the inner periphery of each ring have been added thereto.

The reasons for the presence of said additional notches and the role thereof are the following:

Substantial width of a thin cut ring is such as to make it difficult to obtain a sufficient radial elasticity to make a lightweight and well distributed contact between the outer edge of the thin ring and the cylinder. Due to the notches 916 and 1016, it is possible both to preserve the width of the thin ring as required for keeping it properly in the piston groove, and recover the radial elasticity which is lacking in a wide thin ring.

Moreover, it is known that for manufacturing piston rings of cast iron or steel having a normal thickness, it is necessary to have recourse to variations in the circular form and in the width of the piston ring to obtain proper distribution of the extension effort on all the periphery of the piston rings contacting the cylinder, avoiding in particular the stiffness of the portions adjacent the ends. The number and location of said notches permit to influence such distribution with little expense, for example, by regularly distributing the notches in the sector RR as shown on FIG. 10 which is opposed to the ends and by closer spacing near the ends.

Therefore, with thin rings of elastic metal formed with notches 916 and 1016 properly placed and distributed, there can be obtained thin rings having new properties as follows:

elasticity, suppleness and configuration permitting lightweight equally distributed contact on the whole periphery thereof between the rings and the cylinder.

Figure 11:
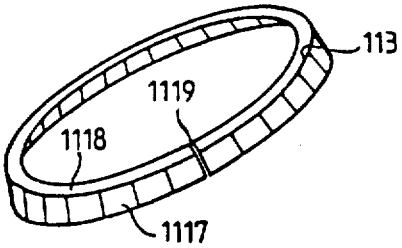
FIGS. 11 and 12 are perspective views of an oil ring and a variation thereof.
Figure 12:
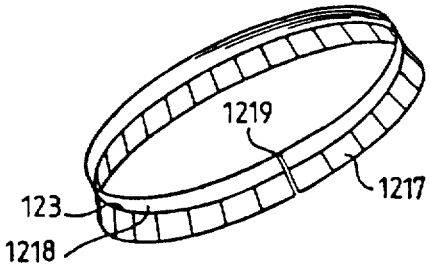

FIGS. 11 and 12 are perspective views of two embodiments 113 and 123 of the oil ring. It comprises a single piece of spring steel consisting of a frusto-conical crown of very thin elastic blades 1117, 1217, for example of a thickness of 0.12 to 0.2 mm. Such blades are separated from one another on the side of the larger base of the frusto-conical crown and connected to one another on the side of the smaller base of said crown, for example, through a flat washer 1118 or a cylinder 1218.

The metal of said oil ring is submitted to a heat treatment conferring optimum elasticity thereto either in the state of raw material or during manufacture. The ends of the elastic blades 1117, 1217 will be lapped or honed in operating configuration before mounting thereof.

They will have a very narrow circular contacting surface, for example, of 0.10 to 0.20 mm. of width, with the cylinder and they can be hardened by localized complementary treatment so as to form a contacting narrow surface of high hardness with the cylinder thereby to increase wear protection thereof. Such protection already results from the fact that the blades constituting such contacting narrow surface are applied against the cylinder with a very small force as explained hereinafter.

Figure 13:
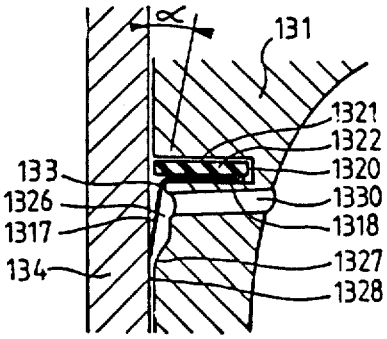
FIGS. 13 and 14 are cross-sectional views of a piston portion, each showing the section of the oil ring of FIGS. 11 and 12 in its operative position.
Figure 14:
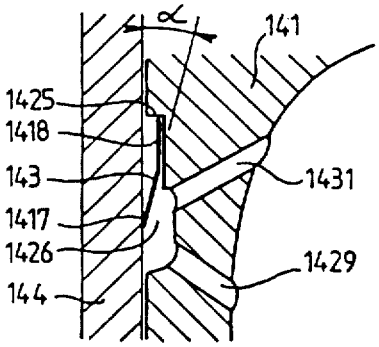

FIGS. 13 and 14 are fragmentary cross-sectional views of a piston 131 or 141 mounted in its cylinder 134 or 144 and carrying at 133 an oil ring of FIG. 11 and at 143 an oil ring of FIG. 14.

The oil ring 133 is held in a groove 1320 of piston 131 by its portion constituting a flat washer 1118, 1318 with minimum clearance 1321. An annular spacer 1322 is used as needed to give groove 1320 an easily produced width greater than the thickness of the washer 1118, 1318 which may be, for example, 0.12 to 0.2 mm. Said annular spacer 1322 is shown in FIG. 15 at 1522. It includes if necessary a cutting 1523 to permit the mounting thereof; its outer diameter is smaller than that of the piston since its purpose is not to bear against the cylinder, and in the resting position, its ends 1523 join; its thickness is shown at 1524 and will be described below with respect to FIG. 20; it can be made of metal, preferably, light metal, or better of plastics material for example polytetrafluoroethylene (Teflon) or of elastics material without cutting for example fluorated elastomer (Viton); in these latter two cases, it acts not only as an annular spacer but also as an annular seal.

The oil ring 143 is held on the piston 141 by its cylindrical portion 1218, 1418 by glueing (by anaerobic resins or cyanoacrylates, for example) in a cylindrical recess 1425 formed in the piston. Between blades 1317 or 1417 and piston 131 or 141 there can be formed in the piston an annular chamber 1326 or 1426 the purpose of which is collecting oil scraped off by blades 1317 or 1417 in the downward strokes of the piston.

Return of such oil to the crankcase can be effected by the following means used as required together or separately:

during the upward strokes of the piston:

a frusto-conical form 1327 connects chamber 1326 and the top of the skirt 1328 of the piston; such form makes an angle with the wall of the cylinder favoring dynamic drive of oil, for example, 7°, and causes return of oil to the crankcase through the clearance between the piston and the cylinder.

a row of radial holes 1429 oriented downwardly of the piston and communicating the bottom portion of the annular chamber 1426 with the center of the piston produces through its orientation a dynamic effect driving oil to the center of the piston. (Optionally, similar holes could be provided to communicate with annular chamber 1326)

during the downward strokes of the piston:

a series of radial holes 1330 perpendicular to the axis of the piston, or of holes 1431 oriented toward the head of the piston, and communicating the top portion of the annular chamber 1326 or 1426 with the center of the piston drives oil to the center of the piston, holes 1431 adding by their orientation a dynamic effect thereto.

FIGS. 16 and 17 are radial and sectional views in the free position of the oil ring 113, 133 of FIGS. 11 and 13 with slits 1632 between the blades 1617 perpendicular to the radial plane of the oil ring.

FIGS. 18 and 19 represent in the same manner an alternative embodiment of the same oil ring comprising slits 1833 between blades 1817 inclined in respect to the radial plane of the oil ring. Due to the contacting differences between the blades and the cylinder during the downward strokes of scraping and the upward stroke of recycling, said inclined slits rotate the oil ring which favors perfect conforming of the oil ring within the cylinder and thus the efficiency thereof.

When the piston is mounted in the cylinder, the elastic blades 1317 and 1417 are contracted by the cylinder; they make with its wall an angle $\alpha$ (FIGS. 13 and 14) and both faces 1119 and 1219 of the cutting of the oil ring abut against each other. In this position, due to their construction and except for very small clearances as required for the operation, i.e. mainly, thermal expansions or deformations and for lubrication, the blades 1317 and 1417 are joined as represented on FIGS. 11 and 12 which show them connected as they are in the cylinder. For example, with a cylinder of 80 mm., the total amount of the very small clearance between the blades can be 0.2 to 0.4 mm. Since the number of blades is about 48 with this diameter, the clearance between blades being positioned in the cylinder is 0.004 to 0.008 mm., i.e. 4 to 8 microns. The very small value of such clearance involves construction of the blade as substantially "lateral jointive blades". These clearances can vary while remaining very small to cope with the operational and lubrication requirements.

The edge of the crankcase side of said jointive blades which is in the scraping position in the downward strokes and in the recycling position in the upward strokes has a continuous circular narrow contacting surface with the cylinder. In the free position outside the cylinder, the ends 1119 and 1219 are preferably closed from construction to facilitate their positioning on the piston, before the mounting thereof in the cylinder, but the elastic blades 1117 and 1217 are opened, i.e. their outer diameter is larger and they are no longer contacting; they present spaces 1632 and 1833 therebetween and form with the axis of the oil ring which is parallel to the wall of the cylinder when the piston is mounted an angle $\beta$ which is larger than angle $\alpha$. The difference between angle $\beta$ and $\alpha$ produces the elastic force which applies each blade against the cylinder when the oil ring is mounted within the cylinder.

The variation of the difference between these two angles and that of the thickness of the elastic blades permit during fabrication adjustment as desired in the elastic pressure supplied by each blade being applied on the cylinder. The angle $\alpha$ of blades 1317 and 1417 with the wall of the cylinder is very small, for example, an angle of 7°, known as being favorable to the Kingsbury effects related to the driving of oil between walls in motion and operating as favorable to the recycling of oil during the upward strokes of the piston as well as to the scraping during the downward strokes.

FIG. 20 is a perspective view of the cutting in an oil ring of the type shown in FIG. 11, a small right-angled ledge 2034 and 2035 disposed on each end of the flat washer 2018 of the oil ring being added on each face of the cutting. The height of said ledge is at the maximum equal to the thickness 1524 of the annular spacer or seal 1322, 1522. Its advantage is to provide a positive abutment for the cutting of the oil ring both ends of which are applied one against the other in operation, said positive abutment protecting said ends from any risk of overlapping which might occur because of their small thickness.

Figure 21:
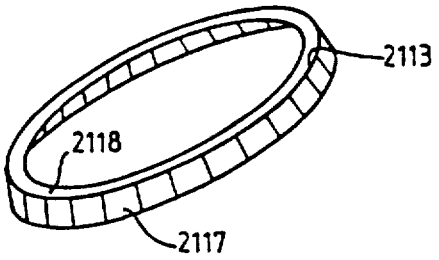
FIGS. 21 and 22 are perspective views of variations of the ring illustrated in FIG. 11.

FIG. 21 shows the piston ring 2113, similar to piston ring 113 of FIG. 11 with its flat annular ring 2118 connecting the flexible blades 2117, but it has no separation therein and the piston ring cannot open. Therefore, it can be mounted only on a piston comprised of at least two parts, with the connection plane of each said two parts forming a lateral face of the groove of the oil ring. (This is the case for the piston shown in FIGS. 5 and 6 of French patent application No. 81.13437 filed on July 8, 1981).

The endless construction of the oil ring may spare a manufacturing step, makes the ring better than a cut piece to handle, is very easy to position and eliminates any risk of overlapping of both ends in operation. While it requires a piston composed of two parts, this arrangement may in certain cases be the best construction.

Figure 22:
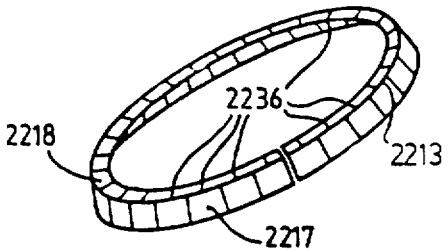

FIG. 22 shows a piston ring 2213 similar to piston ring 113 of FIG. 11 but the annular ring 2218 is formed with inwardly open radial cuttings 2236 extending the full or only part of the width or ring 2218.

Such radial cuttings are distributed in a number at most equal to the number of blades 2217 all around the flat ring 2218 and each cutting is disposed opposite a blade 2217 and at equal distance from both cuttings delimiting such blade so as to provide the largest possible distance of uncut material between the bottoms of each radial cutting and those of the separation cuttings of the blades. The radial cuttings 2236 can be in a smaller number than that of the blades, in that case, they are distributed as regularly as possible on the periphery of the piston ring. The radial cuttings permit the piston ring to open and be positioned easily while avoiding any deformation in a very narrow groove.

According to a certificate of addition to the main patent filed in France on Jan. 15, 1982 under No. 82/00625 an alternate form of embodiment of the compression piston rings of FIGS. 2 and 4 above consists of a flat ring that may present any known section of compression piston ring and a thin section of elastic metal e.g. cast iron or steel, characterized in that it comprises at least one element, the periphery of which is made by construction to the form and dimension of the cylinder, said ring having at least one cutting contacting the cylinder and submitted to the action of a micro-spring of a thickness not in excess of that of the ring, said micro-spring(s) housed in the groove of the ring slightly increase(s) the diameter in the free condition of said ring, so that when the ring is in the cylinder the cutting(s) contacting the cylinder present(s) the required clearance for thermal extension of the ring, on the one hand, and on the other hand, the micro-spring(s) is (are) compressed and exert(s) upon the ring an opening force parallel to its circumference and which is transmitted to the whole of the latter, by producing a force applying it to the cylinder, such force being identical at any point on the circumference.

The good contact distribution and the great precision of such piston ring in its application to the cylinder as well as the regularity of the elastic force applied to the cylinder permit to ensure very efficient tightness and reduction of the application pressure of the ring against the cylinder to a very low level, and the less thick the ring, the lower the pressure.

Figure 23:
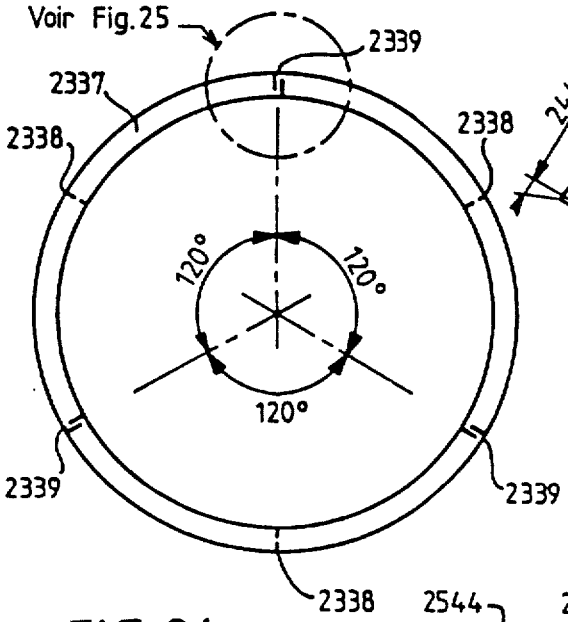
FIGS. 23 and 24 are views of a variation of a compression ring.

FIG. 23 shows an example of compression ring according to the invention consisting of a ring 2337 without through cutting clearances made of elastic metal. Its cross-section is regular on all its periphery; it can be of any known compression ring shape. Preferably, such compression ring will be made of spring steel and its thickness will be small, for example, 0.60 mm. with a compression ring of 80 mm. of diameter.

Such ring may be made of a single part without through cutting if it is mounted to a piston made of multiple parts (as in the case of FIG. 7 of the above-mentioned French Pat. No. 81.13437 of July 8, 1981). Otherwise, it may comprise one or more cuttings. FIG. 23 shows such ring without cutting but there are three dotted lines 2338 which represent three possible cuttings, and in this case, the ring would be composed of three sectors. The faces of each cutting are joined when the ring is mounted so that the numbers of cuttings and sectors, i.e., a cutting and two sectors at the minimum have no influence at least theoretically upon the ring behavior.

Such ring has at least a plurality of partial alternate radial cuttings; FIG. 23 represents three micro-springs formed by such cuttings 2339.

Figure 24:
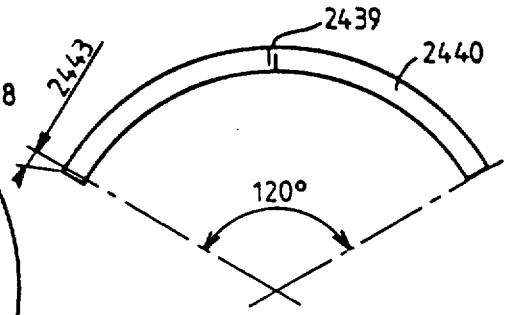
Figure 25:
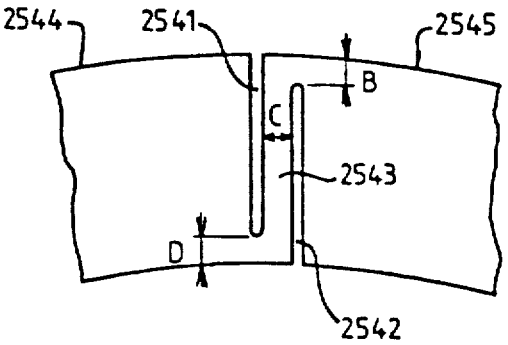
FIGS. 25 and 26 are respectively an enlarged fragmentary view of the micro-spring included in the compression ring of FIGS. 23 and 24 and an example of a modified form of micro-spring.

FIG. 24 shows a sector 2440 including partial alternate radial micro-spring cuttings 2439 and FIG. 25 shows in enlarged detail one of said partial alternate radial micro-spring cuttings each of which comprises at least one partial outwardly open cutting 2541 and a partial inwardly open cutting 2542, which produce therebetween an elastic deformable tongue 2543 which is used as a spring. Each group could comprise a large number of partial alternate cuttings open outwardly and inwardly.

When the ring is mounted in the cylinder, those partial cuttings, in particular, the outer cuttings 2541 are very narrow because they must together be equal to the clearance required for thermal expansion of the ring. For a ring of for example 80 mm., such clearance is in the order of 0.40 mm. If it comprises three sectors 2440 each having a micro-spring 2439, the width of each partial cutting 2541 positioned in the cylinder would be about 0.13 mm. Assuming that each alternate cutting is realized with a width of for example 0.50 mm., the length of the circumference of the ring in the free state in excess of that of the cylinder would be: $3\times0.50-3\times0.13=1.11$ mm., which would correspond to a diameter in excess of that of the cylinder of $1.11/=0.353$ mm.

For mounting the ring in the cylinder, the cuttings of each sector will be jointive, abutting one against the other, and each micro-spring will undergo compression urging increase of the ring diameter, thereby to apply it against the cylinder. Such enforcement will be distributed regularly on the contour of the ring, because such contour will exactly follow the cylinder wall since it was made to its form and size, on the one hand, and on the other hand, because the micro-springs will exert his (their) bias in the circumferential direction, thereby transmitting exactly the same effort to all the points on the circumference of the ring, particularly with at least three micro-springs regularly disposed.

For a given thickness of the ring, the widths B and D in FIG. 25 formed between the bottom of the cuttings and the outer and inner edges of the ring, the width C of each elastic tongue 2543 on one hand and on another hand the width of the cuttings 2541 and 2542 which would increase the diameter of the free piston ring constitute means for adjusting the characteristics of each micro-spring 2339, 2439 in order to obtain the most accurate contact pressure between ring and cylinder as required and to cope with the effects of wear. Preferably, the bottoms of the partial cuttings 2541, 2542 are rounded up to prevent initiating breakages by metal fatigue about said cutting bottoms.

The periphery of such piston ring is obtained by any known forming means such as by rolling, machining, grinding to a diameter very close, or even exactly equal to that of the cylinder.

If the ring is in a single piece and has no through cutting therein it will be necessary to make it to a diameter slightly higher than that of the cylinder to obtain, in the cylinder, a clearance corresponding to thermal expansion after compression of the micro-springs.

If the ring is composed of several sectors, each sector in the free state is slightly longer 2443 than that fraction of circumference of the cylinder which it must occupy, in order to ensure compression if its micro-springs 2439 and to reduce the width of its partial cuttings 2541 to the clearance required for thermal expansion of the ring. Such elongation of the section will be particularly easy with rings made by rolling continuously steel band. As a matter of fact, such process permits to obtain a roll of jointive windings which can be ground outwardly to the exact size of the cylinder, and sectors of any lengths can be cut in this roll.

Figure 26:
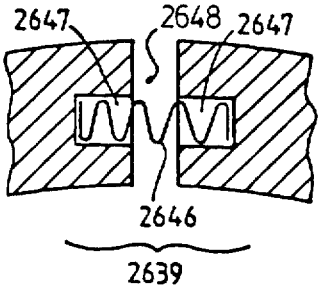

Finally, when for example in large cylinders the ring is thick enough and the ring itself includes at least one through cutting therein, following a variant of the invention, the micro-springs of the type shown in FIG. 25 may be replaced as illustrated in FIG. 26 by one or more coiled springs 2646 housed in holes 2647 made in the faces of the cuttings.

All the above-mentioned exemplifying dimensions for thicknesses of materials, contacting width between blades and cylinder, various clearances or other correspond to parts for a cylinder diameter in the order of 80 mm.

These various dimensions may vary depending on the diameter of cylinder, but remain in the proportion determined by the above-mentioned numerical examples.

The operation and advantages of this new assembly cylinder, lightweight piston and piston rings are the following:

The compression ring, FIGS. 2 and 4, comprises at least one thin elastic metallic ring the ends of which are provided with closing means for sealing off the gas passage along the cylinder and associated with a further seal of Teflon, for example. Due to the closing of the ring ends passage, and to the assistance of the seal, the compression ring produces very high tightness against gas passage, with reduced frictional efforts on the cylinder because the compression force of thin rings is much smaller than that of the usual thicker compression rings.

As to the compression ring in FIGS. 23, 24 and 25, it will provide new results as compared to the known rings:

its contact with the cylinder is the best possible since it is formed, machined or ground to a shape and size very close, if not exactly equal, to those of the cylinder.

the application force of its periphery on the cylinder is the same in all points. For these two reasons, this force is much lower than that of any other ring. Moreover, it only results from the reaction of micro-springs 2339, 2439, 2639 which can only develop very low forces.

finally in the case of micro-springs 2339, 2439, it has no clearance from its total cutting as its total cutting(s) 2338 if there is any is(are) jointive and the cutting clearance on the periphery of the ring which is required for thermal expansions is divided by the number of the micro-springs 2439, which laminate the blow-by through division into as many passages.

Thus, such ring is much tighter than any known rings with much smaller friction and wear. Moreover, such ring is very well adapted to the use of a groove seal made of Teflon whether it be without any cutting if mounted to a dismountable piston or with cutting as described in relation to the other rings, thereby still increasing efficiency against gas passages.

Furthermore, said ring has a great circumferential flexibility by increasing the number of groups of partial alternate radial cuttings, which results in significant advantage with engines having cylinders submitted to large deformations in operation.

Finally, its manufacturing from thin steel realized by rolling as explained above is much more economical than the production of the presently used conventional rings.

On the other hand, it is known that a gas passage tight compression ring has the disadvantage of producing an oil pumping effect to the top portion of the cylinder. The cooperation with the oil ring of very high efficiency as seen hereinafter, remedies this disadvantage.

It is also known that the steadiness in service of the seal of plastics material (in particular, Teflon) is excellent; it may last as long as the engine save for the attack of its outer edge by the asperities of the cylinder which are required in the present state of the technology to provide oil reserves on the walls of the cylinder to avoid scuffing.

However, the very high reduction of the gas passage and of the friction of the compression ring by eliminating the dragging along of abrasive combustion residues, the hot points of the compression ring and the burning of oil, on the cylinder and about the compression ring, create new lubrication conditions which lead to two new advantages:

prolongation of the contact between the piston and the cylinder up to the piston head, normally limited to the piston jacket below the oil ring, on the one hand, and on the other hand, utilization of a very high polishing level for the inner surfaces of the cylinders.

These two measures reduce friction, improve thermal exchange between cylinder and piston and in addition to the fact that the piston may be at a lower level by having only two ring segments, they permit reduction of its height and therefore a substantial reduction of its weight. Moreover, they alleviate the lateral wear of the seal of plastic material (in particular, Teflon).

As regards the operation of the oil ring, its elastic blades have only a contacting circular narrow surface with the cylinder under very light pressure and are put in an ideal position both to scrape oil in the downward strokes and recycle it in the upward strokes; therefore they ensure at the highest level possible the control of the oil climbing toward the combustion chamber and the reduction of the very high friction of usual oil rings which effect scraping through high pressure from lips having not a contacting narrow surface with the cylinder but a contacting larger surface therewith, and working in a perpendicular position against the cylinder which is unfavorable to the scraping and recycling since in one stroke out of two, the upward stroke, oil rings perpendicular to the cylinder scrape and return oil in the wrong direction, on the side opposite to the crankcase.

Thus, the new assembly positively combines by a new cooperation of its various elements:

the reduction to a negligible level or the suppression, of passage of gas between piston and cylinder;

more effective control of the oil climbings;

the reduction of most of the friction and wear between pistons and cylinders;

the lightening of the piston and its piston rings.

This combination thereby reduces expenditure of energy, oil, mechanical wear and maintenance.

Still further advantages result therefrom, among them, in particular, better cold starting by improvement of the compression, especially with Diesel engines, and the reduction of pollution by diminishing the clearance volume of air and fuel between piston, piston rings and cylinder.

Finally, it must be noted that the separate utilization of the compression ring and the oil ring as described in this application is within the scope of this invention, since although such utilization will not produce all the effects from the above mentioned combination, each of those elements used separately brings about its own advantages, in particular:

as regards the compression ring: high tightness against blow-by, reduction of friction, diminution of wear, lightening of the compression ring, better performance, improved duration of the elements and saving of energy;

as regards the oil ring: simple effective scraping of oil, very efficient in the downward strokes by returning oil to the crankcase and simple effective recycling of the oil film remaining on the cylinder, very efficient in the upward strokes bypassing oil into the crankcase circuit, reduction of the friction on the cylinder to a very small fraction of the friction produced by all the other oil rings, reduction of wear, lightening of the oil ring, better performance, improved duration of the elements and saving of energy.

The two main elements of the invention have therefore an individuality which remains separately useful but only their combined cooperation produces all the advantages of the invention.

Specifically:

the compression ring, if used separately from an oil ring having a very effective oil control, cannot eliminate the oil pumping effect already mentioned above which causes excessive oil consumption, which is very difficult, if not impossible, to reduce sufficiently and safely enough in mass production.

if the oil ring is used separately from the compression ring:

it is exposed to gas passage from the usual compression rings and thus, receives together with such gases abrasive combustion residues produced and driven thereby, which is a cause of wear of its contacting narrow surface with the cylinder, on the one hand, and on the other hand, it is bound to operate in such a cylinder having the usual rugosity levels instead of using a cylinder having a very high level of polishing.

These two conditions are detrimental to the proper preservation without wear of the narrow circumferential bearing of the elastic blades of the oil ring against the cylinder.

We claim:

1. An assembly comprising a cylinder, for internal combustion engine or compressor, extending between a compression head and a crankcase, a piston, and piston rings set reciprocable within said cylinder characterized by an improved combination of compression ring and oil control ring means for reducing friction, blow-by, and oil climbing, said means comprising: compression ring means in a piston groove coaxial with the cylinder adjacent the compression head end of said piston for minimizing blow-by from said compression head to said crankcase, and oil control ring means in a piston groove adjacent said compression ring means on the crankcase side constructed with acute conical elastic circular outer edge skirt means projecting uniformly from its piston groove for differentially scraping oil from the cylinder wall during the strokes of the piston toward said crankcase, and for bypassing oil on the cylinder wall by Kingsbury effect during strokes of the piston away from said crankcase, said skirt means comprising a plurality of separated metal blades projecting from an integral connecting portion of said oil control ring means, the composite free state circumference of said blades being greater than their operating circumference thereby providing said outward spring bias upon assembly.

2. The assembly of claim 1 wherein said compression ring means comprises at least one thin radially cut ring of elastic metal the circular lip of which is applied against the cylinder by its elastic over size free state and wherein closing means is provided for sealing off passage of gas through clearance at the radial cut of the ring.

3. The assembly of claim 2 wherein said elastic metal ring means is provided with substantial sufficient end separation, and said closing means comprises a ring segment of compressible elastic plastic material capable of filling the gap at said radial cut of the metal ring under thermal conditions of minimum ring extension and of absorbing without permanent deformation the expansion of said ring extension under thermal conditions of maximum metal ring extension.

4. The assembly of claim 2 or 3 including at least one thin cut supplemental ring of plastic material adjacent said metal ring in a piston groove on the crankcase side of said metal ring, said plastic ring having a circumferential dimension providing elastic contact with said cylinder free of any end clearance gap throughout all thermal conditions of operation.

5. The assembly of claim 2 wherein said metal ring means includes two adjacent thin cut metal rings with means for retaining their respective end gaps in circumferentially spaced relation.

6. The assembly of claim 5 wherein said last means comprises inter-engaging notch and projection means formed in the respective rings to prevent relative circumferential displacement without otherwise restricting independent engagement with the cylinder wall.

7. The assembly of claim 2 or 3 including a plurality of notches around the inner edge of said ring adapted to increase the radial flexibility for a given radial thickness appropriate for stable piston groove engagement.

8. The assembly of claim 2 or 3 wherein adjacent partial radial cuttings extending respectively from the outer and inner edges of the metal ring means are provided at a plurality of circumferentially spaced locations which contribute an elastic compressibility of ring segments' circumference to accommodate variable thermal operating conditions, said ring segments being provided with a free form curvature substantially equal to said cylinder wall biased resiliently outwardly beyond operating circumference in the free state through the ring connections between said partial cuttings, and being adapted to substantially close said partial cuttings under operating conditions of maximum thermal expansion of said compression ring means.

9. The assembly of claim 8 wherein said metal ring means is provided with at least one through cut intermediate said partial cuts adapted to accommodate assembly in an integral piston groove, the ends of any complete cutting being held in engagement throughout all thermal operating conditions by the spring bias provided through said partial cuttings.

10. The assembly of claim 1 wherein separation between said blades upon assembly is only sufficient to provide controlled calibrated passage for lubricating oil together with accommodation for thermal expansion of said oil control ring means.

11. The assembly of claim 10 wherein said connecting portion comprises a radially extending flat ring portion.

12. The assembly of claim 10 wherein said connecting portion comprises a cylindrically extending portion bonded to a cylindrical portion of said piston.

13. The assembly of claim 11 wherein said oil control ring means has a through radial cut to accommodate assembly within an integral piston groove.

14. The assembly of claim 11 wherein the connecting portion of said ring is integral without through radial cut for use in a multi-piece piston separable at the location of the oil control ring groove.

15. The assembly of claim 1 wherein separation of said blades is inclined to the axis of said piston to provide a ring rotating bias during operation.

16. The assembly of claim 11 wherein said connecting portion is provided with a plurality of uniformly distributed radially extending cuts intermediate the separation of said blades.

17. The assembly of claim 16 wherein said radial extending cuts are equal in number and central between separation of said blades.

18. The assembly of claim 1 wherein said compression ring means includes at least one thin cut ring of elastic metal the circular lip of which is applied against the cylinder by its elastic oversize free state, closing means for sealing off passage of gas through the clearance of the cutting, at least one thin cut ring of plastic material 26, 76 the circular lip of which is applied against the cylinder through the effect of its circumference with both ends 715 in contact, said rings being disposed with a small clearance 27 in a groove of a piston, and said ring 26, 76 of plastic material being disposed between the grooved face of the piston 21 on the side of the crankcase and said metal ring 25, 35.

19. The assembly of claim 1 wherein said oil control ring means is made of one-piece spring steel formed with a circular row of thin elastic lateral blades 1117, 1217, 1317, 1417, 2117, 2217 connected between one another and to the piston by the common side of their row 1118, 1218, 1318, 1418, 2018, 2118, 2218 located on the side of the piston head, and said blades being applied against the cylinder 134, 144 by the edge of their row located on the side of the crankcase through the elastic force of each blade, their outer lateral faces making with the wall of the cylinder an acute conical angle $\alpha$ opening to the piston head, said blades forming together a closed elastic skirt sealed on the side of the piston head and open to the crankcase, said piston comprising on its periphery, at the level of the blades of the oil ring 1317, 1417, an annular space 1326, 1426, for collecting scraped oil and means 1327, 1429, 1330, 1431 for return thereof into the crankcase.

20. The assembly of claim 1 wherein said compression ring means includes at least one thin cut ring of elastic metal the circular lip of which is applied against the cylinder by its elastic oversize free state, closing means for sealing off passage of gas through the clearance of the cutting, at least one thin cut ring of plastic material 26,76 the circular lip of which is applied against the cylinder through the effect of its circumference with both ends 715 in contact, said rings being disposed with a small clearance 27 in a groove of a piston, and said ring 26, 76 of plastic material being disposed between the grooved face of the piston 21 on the side of the crankcase and said metal ring 25, 35, and wherein said oil control ring means is made of one-piece spring steel formed with a circular row of thin elastic lateral blades 1117, 1217, 1317, 1417, 2117, 2217 connected between one another and to the piston by the common side of their row 1118, 1218, 1318, 1418, 2018, 2118, 2218 located on the side of the piston head, and said blades being applied against the cylinder 134, 144 by the edge of their row located on the side of the crankcase through the elastic force of each blade, their outer lateral faces making with the wall of the cylinder an acute conical angle $\alpha$ opening to the piston head, said blades forming together a closed elastic skirt sealed on the side of the piston head and open to the crankcase, said piston comprising on its periphery, at the level of the blades of the oil ring 1317, 1417, an annular space 1326, 1426, for collecting scraped oil and means 1327, 1429, 1330, 1431 for return thereof into the crankcase.

21. The assembly of claim 18 wherein said compression ring means comprises at least one thin cut metal ring the outer circular lip of which is applied against the cylinder by machining the outer periphery in the exact shape and size of the cylinder, including means for providing radially outward elastic bias, and closing means for sealing off passage of gas through the clearance of the cutting.

22. The assembly of claim 1 further characterized in that the means for closing off the cutting comprises two thin cut rings 45, 411, 55, 611, assembled side by side and made of elastic metal the circular lips of which are applied against the cylinder 14, 44 by their elastic oversize free state, said rings 45 being provided with means 512, 912, 613, 1013, 614, 1014, for preserving independence of their movements but imposing limitation to their circumferential location relative to each about the axis of the piston thereby to prevent alignment of their respective cuttings.

23. The assembly of claim 1 further characterized in that the means for sealing off the cutting comprises relatively plastic contiguous closing means 310, extending between substantially spaced ends 38, 39 of said ring 25, 35.

24. The assembly of any of claims 1, 2, or 3, further characterized in that at least one thin ring of elastic metal 25, 35, 45, 411, 55, 611, 95, 1011, of the compression ring 12, 22, 42, includes notches 916, 1016, distributed on its inner periphery.

25. The assembly of any of claims 1, 2, or 3, further characterized in that the cutting of the oil ring comprises a closing abutment 2034, 2035, cooperating with a spacer 1322, 1522, having a thickness 1524 at least equal to the height of ledges 2034, 2035 of said abutment.

26. The assembly of claim 1 wherein said compression ring means comprises at least one elastic metal ring 2337, preferably of thin steel the cross section of which is uniform, with its periphery accurately made to a circular form having a circumference substantially equal to that of the cylinder, means for providing elastic application of said ring against said cylinder comprising at least one micro-spring 2339, 2439 consisting of at least two partial alternate radial cuttings on the outside 2541 and the inside 2542 of the ring, and by elongation of the circumference of said ring 2443 in excess of the circumference of the cylinder which when added to the clearance required for expansion of the piston ring is at most equal to the sum of the widths of said partial alternate radial cuttings 2541, 2542 with said widths being determined for operation when the micro-spring(s) is (are) compressed in the operative position in the cylinder.

27. The assembly of claim 1 wherein said compression ring means includes at least one micro-spring 2639 comprising a coiled spring 2646 housed in holes 2647 formed in faces of the cutting(s) with an expansion in the free state of the circumference of said ring greater than the end clearance necessary for accommodating thermal expansion of the piston ring.

28. An assembly according to any of claims 20, 22, or 23 characterized in that at least one thin ring of elastic metal 25, 35, 45, 411, 55, 611, 95, 1011 of the compression ring 12, 22, 42 comprises nothces 916, 1016 distributed on its inner periphery.

29. An assembly comprising a cylinder for internal combustion engine or compressor, a piston and piston ring set, characterized by improved means for reducing friction and oil climbing, the means used comprising:

an oil ring means 13, 113, 123, 133, 143, 2113, 2213 for scraping oil from the cylinder wall during the downward strokes of the piston, and bypassing oil on the cylinder wall during the upward strokes of the piston, said oil ring means being made of one piece spring steel formed with a circular row of very thin elastic touching lateral blades 1117, 1217, 1317, 1417, 2117, 2217 connected to one another and to the piston by the common side of their row 1118, 1218, 1318, 1418, 2018, 2118, 2218 located on the side of the piston head, and said blades being applied against the cylinder 134, 144 by the edge of their row located on the side of the crankcase through the elastic force of each blade, their outer lateral faces making with the wall of the cylinder an acute conical angle $\alpha$ opening to the piston head, said blades forming together a closed elastic skirt sealed on the side of the piston head and opened to the crankcase;

said piston comprising on its periphery, on the level of the blades of the oil ring 1317, 1417, an annular space 1326, 1426 for collecting scraped oil and means 1327, 1429, 1330, 1431 for the return thereof into the crankcase.

30. An assembly according to any of claims 1, 2, 3, 20, 21, 22, 23 or 29 including compression ring means consisting of a flat thin, uniform ring 2337 made of elastic metal, preferably, spring steel, of which the periphery is constructed to the shape and dimension of the cylinder, said ring having at least one cutting 2541 in contact with the cylinder and submitted to the action of micro-spring means 2339, 2439, 2639 having a thickness not in excess of that of the ring, said micro-spring means housed in the groove of the ring slightly increasing the diameter in the free condition of said ring such that when the ring is in the cylinder, the cuttings 2541, 2648 contacting the cylinder presents the required clearance for thermal extension of the ring, said micro-spring means when compressed and exerting upon the ring an opening force parallel to the circumference thereof and by producing a force applying the ring uniformly against the cylinder.

31. An assembly according to claim 30 wherein each micro-spring 2339, 2439 consists of at least two partial alternate cuttings, outwardly 2541 and inwardly 2542 of the ring, separated by an elastic tongue 2543.

32. An assembly according to claim 30 wherein each micro-spring 2639 consists of a helical spring 2646 housed in holes 2647 formed in cutting faces of the ring.

33. An assembly according to claim 1 or 29 including an annular ring 2218 of the oil ring formed with inwardly open cuttings 2236 extending at least part of the width of the ring 2218.

*34. An assembly comprising a cylinder for internal combustion engine or compressor extending between a compression head and a crankcase, a piston, and piston ring set reciprocable within said cylinder characterized by compression ring means in a piston groove providing free axial clearance comprising at least one thin metal ring having a plurality of separate circumferentially spaced segments, said ring segments being provided with free form curvature substantially equal to said cylinder wall and when in abutting relation a free form circumference slightly greater than operating circumference, and means for resiliently biasing said segments outwardly beyond operating circumference in the free state.*

*35. The assembly of claim 34 wherein said means for biasing includes partial radial cuttings in the metal ring means at a plurality of circumferentially spaced locations which contribute an elastic compressibility of ring segments' circumference to accommodate variable thermal operating conditions.*

*36. The assembly of claim 35 wherein said metal ring means is provided with at least one through cut intermediate said partial cuts adapted to accommodate assembly in an integral piston groove, the ends of any complete cutting being held in engagement throughout all thermal operating conditions by the spring bias provided through said partial cuttings.*

*37. The assembly of claim 36 wherein said partial radial cuttings extend respectively from the outer and inner edges of the metal ring means forming a plurality of micro springs 2339, 2439.*

*38. The assembly of claim 37 wherein said metal ring means is provided with three through cuts intermediate said partial cuts.*

*39. The assembly of any of claims 34–38 including at least one thin cut supplemental ring of plastic material adjacent said metal ring in a piston groove on the crankcase side of said metal ring, said plastic ring having a circumferential dimension providing elastic contact with said cylinder free of any end clearance gap throughout all thermal conditions of operation.*

*40. An assembly comprising a cylinder for internal combustion engine or compressor extending between a compression head and a crankcase, a piston, and piston rings set reciprocable within said cylinder characterized by improved means for reducing friction and oil climbing, said means comprising oil control ring means in a piston groove constructed with acute conical elastic circular outer edge skirt means projecting uniformly from its piston groove for differentially scraping oil from the cylinder wall during the strokes of the piston toward said crankcase, and for bypass-*

*ing oil on the cylinder wall by Kingsbury effect during strokes of the piston away from said crankcase, said skirt means comprising a plurality of separated metal blades projecting from an integral connecting portion of said oil control ring means, the composite free state circumference of said blades being greater than their operating circumference thereby providing said outward spring bias upon assembly.*

*41. The assembly of claim 40 wherein separation between said blades upon assembly is only sufficient to provide controlled calibrated passage for lubricating oil together with accommodation for thermal expansion of said oil control ring means.*

*42. The assembly of claim 41 wherein said oil control ring means has at least one through radial cut to accommodate assembly within an integral piston groove.*

* * * * *